United States Patent
Cranford, Jr. et al.

(10) Patent No.: US 7,346,094 B2
(45) Date of Patent: Mar. 18, 2008

(54) SYSTEM AND METHOD FOR TRANSMITTING DATA AND ADDITIONAL INFORMATION SIMULTANEOUSLY WITHIN A WIRE BASED COMMUNICATION SYSTEM

(75) Inventors: Hayden C. Cranford, Jr., Cary, NC (US); Martin Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 10/319,705

(22) Filed: Dec. 13, 2002

(65) Prior Publication Data

US 2004/0114670 A1 Jun. 17, 2004

(51) Int. Cl.
*H04B 1/00* (2006.01)
(52) U.S. Cl. ............... 375/130; 375/132; 375/134; 375/135; 375/136; 375/137; 375/141; 375/146; 375/147
(58) Field of Classification Search ........ 375/132, 375/130, 146, 147, 135, 136, 134, 137, 141
See application file for complete search history.

(56) References Cited

U.S. PATENT DOCUMENTS

| | | | | |
|---|---|---|---|---|
| 3,536,840 A * | 10/1970 | Sullivan | ............... | 714/799 |
| 4,672,605 A | 6/1987 | Hustig et al. | | |
| 4,843,352 A | 6/1989 | Kamisaka et al. | | |
| 5,267,260 A * | 11/1993 | Lee | ............... | 370/342 |
| 5,297,268 A * | 3/1994 | Lee et al. | ............... | 711/164 |
| 5,410,541 A | 4/1995 | Hotto | | |
| 5,500,871 A * | 3/1996 | Kato et al. | ............... | 375/146 |
| 5,644,577 A * | 7/1997 | Christensen et al. | ........ | 370/506 |
| 5,940,442 A | 8/1999 | Wong et al. | | |
| 5,999,561 A | 12/1999 | Naden et al. | | |
| 6,088,590 A | 7/2000 | Anderson et al. | | |
| 6,147,561 A * | 11/2000 | Rhee et al. | ............... | 331/12 |
| 6,182,236 B1 * | 1/2001 | Culley et al. | ............... | 713/503 |
| 6,314,128 B1 | 11/2001 | Bunker et al. | | |
| 6,349,133 B1 | 2/2002 | Matthews et al. | | |
| 6,351,485 B1 | 2/2002 | Soe et al. | | |
| 6,687,779 B1 * | 2/2004 | Sturm et al. | ............... | 710/305 |
| 6,754,238 B1 * | 6/2004 | Lentine et al. | ............... | 370/528 |
| 6,853,675 B1 * | 2/2005 | Oleynik | ............... | 375/130 |
| 2001/0007551 A1 * | 7/2001 | Katsura et al. | ............... | 370/329 |
| 2002/0057729 A1 * | 5/2002 | Farbod et al. | ............... | 375/150 |
| 2002/0172205 A1 * | 11/2002 | Tagore-Brage et al. | | 370/395.42 |

(Continued)

FOREIGN PATENT DOCUMENTS

JP 61-248698 11/1986

(Continued)

OTHER PUBLICATIONS http://cas.et.tudelft.nl/~glas/ssc/technOld/.*

(Continued)

*Primary Examiner*—Mohammed Ghayour
*Assistant Examiner*—Leila Malek
(74) *Attorney, Agent, or Firm*—Kerry B. Goodwin

(57) ABSTRACT

A system and method is provided for transmitting data signals and additional information signals having partially overlapping frequency bands simultaneously within a wire based communication system over the same wired medium using a spread spectrum technique for modulating the additional information signals.

15 Claims, 8 Drawing Sheets

U.S. PATENT DOCUMENTS

2003/0103481 A1* 6/2003 Heo et al. .................. 370/335
2003/0201802 A1* 10/2003 Young ........................ 327/108
2004/0047409 A1* 3/2004 Lee et al. .................. 375/232
2004/0240580 A1* 12/2004 Bessios et al. ............. 375/288

FOREIGN PATENT DOCUMENTS

| | | |
|---|---|---|
| JP | 01-175330 | 7/1989 |
| JP | 05-022250 | 1/1993 |
| JP | 08-298681 | 11/1996 |

OTHER PUBLICATIONS http://www.rhyshaden.com/encoding.htm.*

* cited by examiner

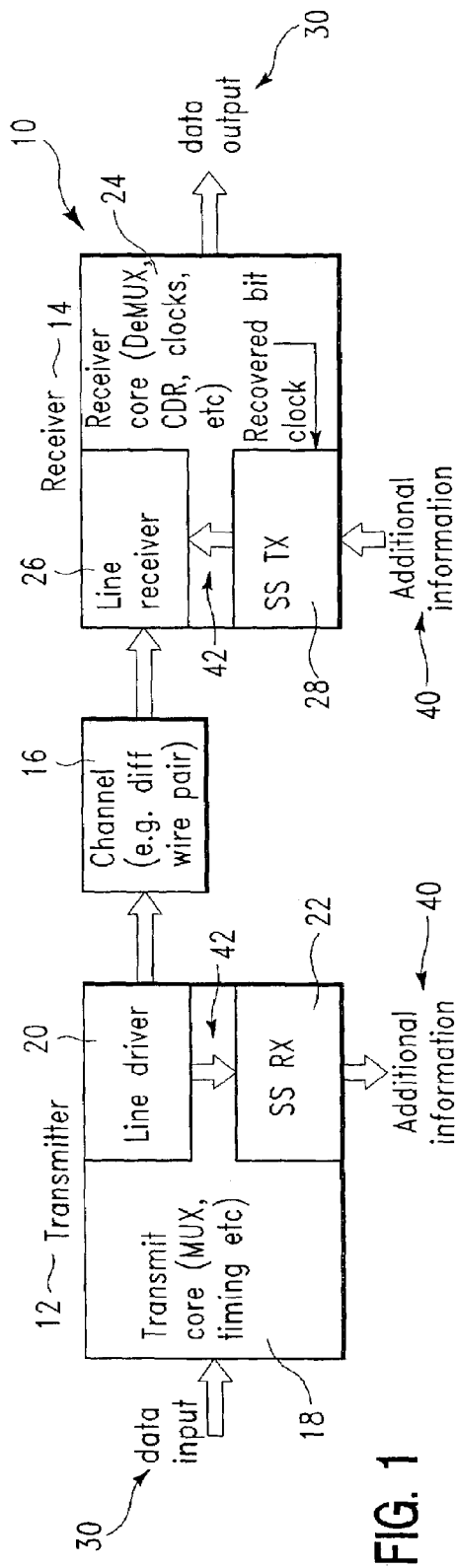
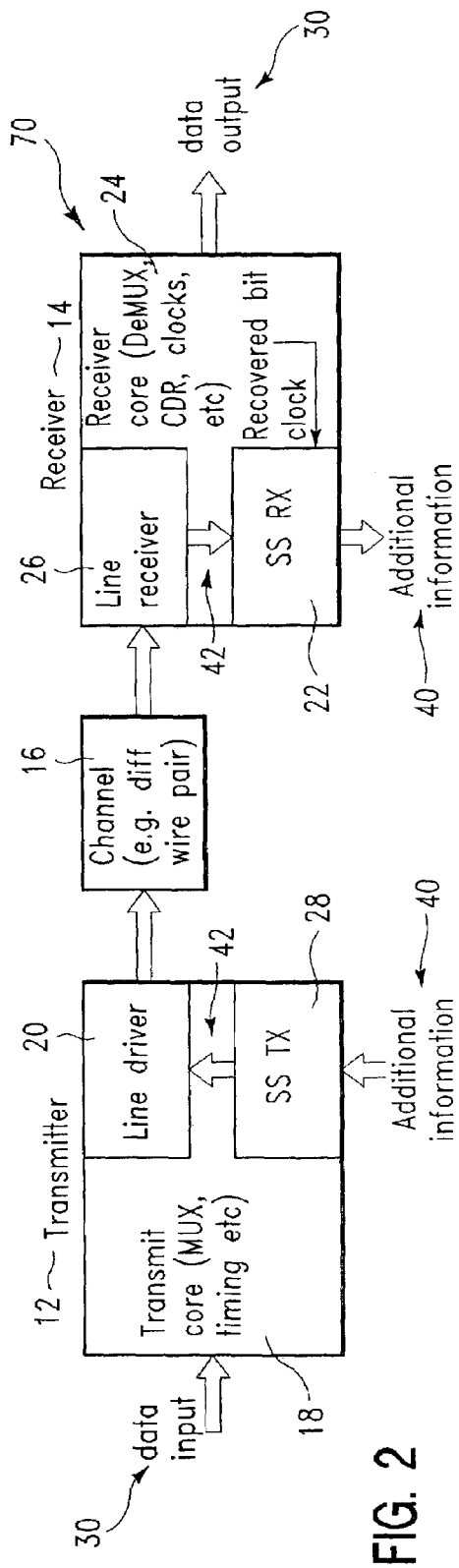
FIG. 1
FIG. 2

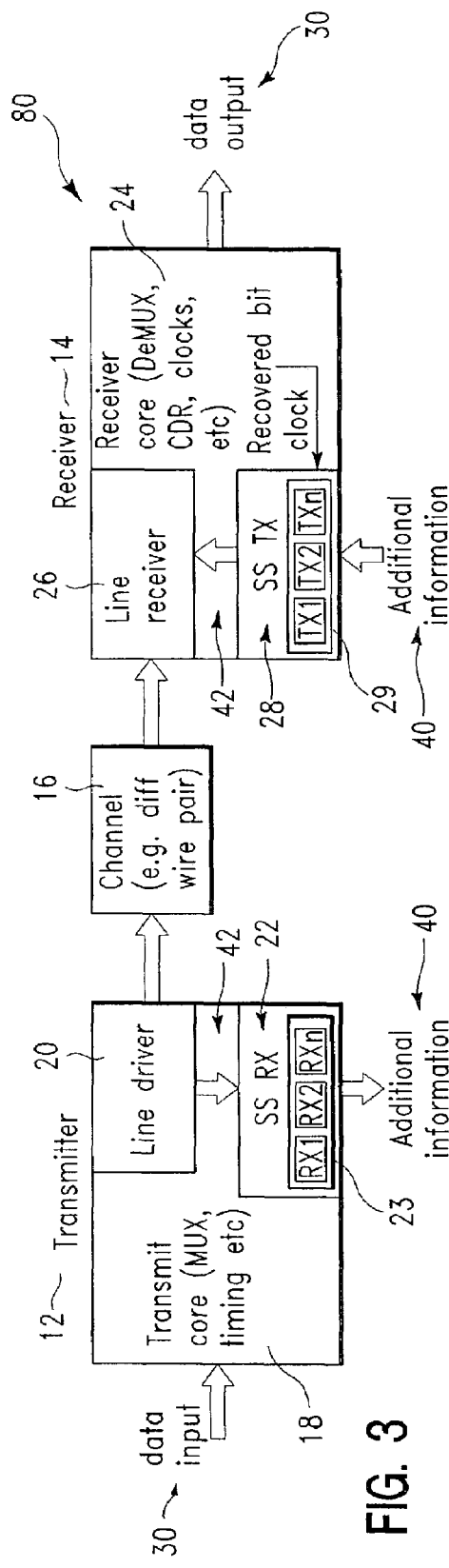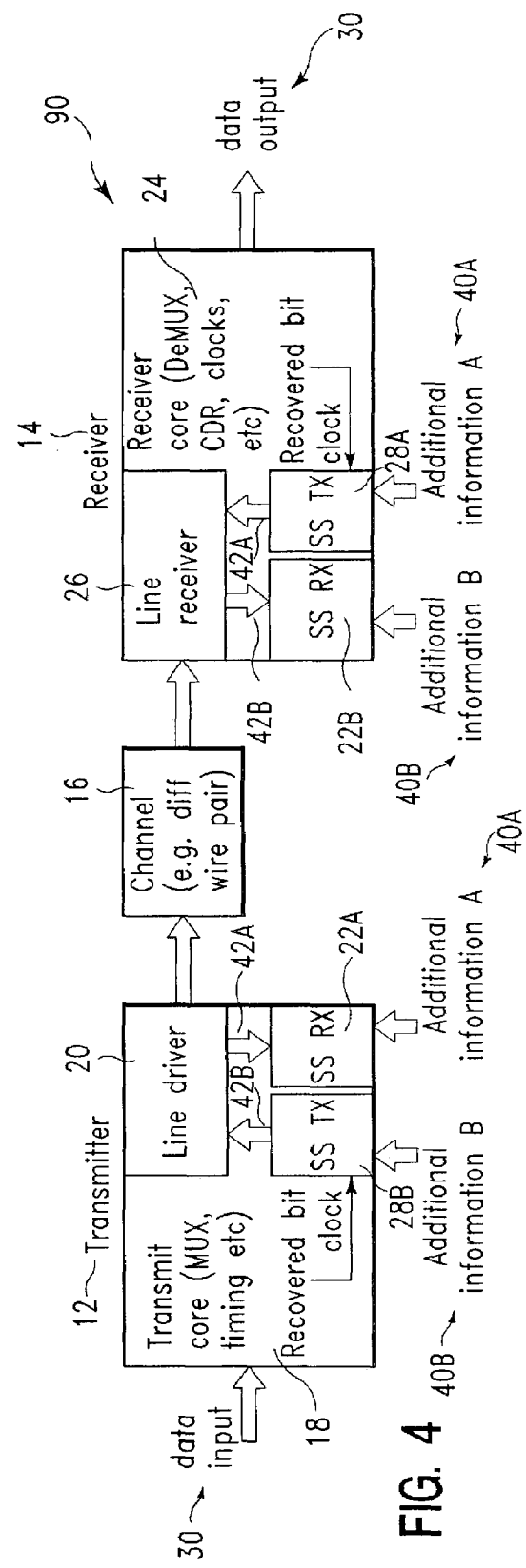

SYSTEM AND METHOD FOR TRANSMITTING DATA AND ADDITIONAL INFORMATION SIMULTANEOUSLY WITHIN A WIRE BASED COMMUNICATION SYSTEM

FIELD OF THE INVENTION

The invention is related to wired data communications, and more specifically to a system and method for transmitting data over a wired medium simultaneously with additional information transmitted by a spread spectrum technique over the same wired medium.

BACKGROUND OF THE INVENTION

In present wire based communication systems, information additional to the system data is typically queued up and transmitted in series with the system data as bandwidth permits. Such an approach utilizes valuable system bandwidth for the transmission of information additional to the system data, such as: control information (e.g. network router or switch flow control), signaling of status information, amplitude control, link parameter setup, equalization information, or network applications with very unsymmetrical data rates. Therefore, a need exists for the simultaneous transmission of additional information and system data over the same wired medium.

It would be further desirable for additional information to be transmitted simultaneously over the same wired medium to control the real-time operation of the transmitter and/or receiver to address certain problems in communication. For example, one problem of particular concern to communication systems having data rates in the Gbit/s range is that printed wires of a PCB back plane or the lossy transmission lines of a ceramic multi-chip carrier are introducing large amounts of unwanted ISI (intersymbol interference) in data transmission system. ISI reduces the timing margin of a transmission system by introducing a time shift in the zero (or reference level) crossings which is dependent on the history of transmitted bits. This is especially true for NRZ (non return to zero) transmission with its potentially large number of consecutive ones or zeros (so called long run length).

There are currently two methods used to reduce ISI introduced timing jitter. The first method is based on coding or scrambling of the data stream to guarantee that no long run lengths are occurring. The second method uses a best guess predistortion of the transmitted waveform which represents the data in order to correct the nonlinear behavior of the transmission media based on the knowledge of the polarity of previously transmitted bits. The first method either introduces coding overhead and thereby increases the bandwidth requirements of the transmission system, or in the case of scrambling, long run lengths can sometimes occur. The second method is based on a guess of the characteristics of the transmission channel. It will therefore result in sub-optimum solutions and must be programmatically adjusted for each data link. In the case of a high-density interconnection system, this is not practical due to the high number of links and the different lengths of transmission lines.

In addition, transmitter systems in which ISI introduced timing jitter is present sometimes use adaptive equalization in the receiver to correct for the nonlinear behavior of a transmission media. However, for transmission rates in the Gbit/s range, such equalization methods become very difficult to implement in a receiver because the ISI introduced timing jitter significantly reduces timing margin to the point where the receiver may no longer properly function.

BRIEF DESCRIPTION OF THE DRAWINGS

FIG. 1 is a diagram illustrating a wire based communication system with spread spectrum up channel of a preferred embodiment of the invention.

FIG. 2 is a diagram illustrating a wire based communication system with spread spectrum down channel.

FIG. 3 is a diagram illustrating a wire based communication system with a plurality of spread spectrum up channels.

FIG. 4 is a diagram illustrating a wire based communication system with a spread spectrum up channel and a spread spectrum down channel.

SUMMARY OF THE INVENTION

Figure 5:
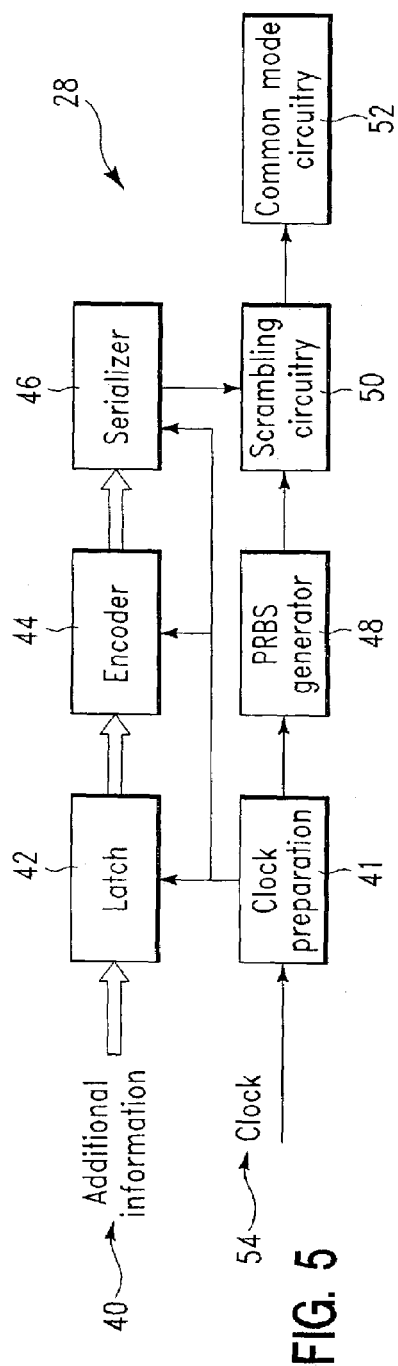
FIG. 5 is a diagram illustrating a schematic of a spread spectrum transmitter.

An object of the invention is to transmit data signals and additional information simultaneously within a wire based communication system.

Another object of the invention is to minimize the number of channels in a wire based communication system when simultaneously transmitting data signals and additional information.

Another object of the invention is to transmit additional information in the same direction or the opposite direction of the data signals simultaneously within a wired communication system.

In accordance with the present invention, a system and method is provided for transmitting data signals and additional information signals having partially overlapping frequency bands simultaneously within a wire based communication system over the same wired medium using a spread spectrum technique for modulating the additional information signals.

Preferably, signal interference between simultaneously transmitted data signals and additional information signals over the same wired medium is reduced.

Preferably, the complexity of a wire based communication system is minimized by transmitting data signals and additional information signals over the same wired medium simultaneously.

Preferably, channel equalization information is transmitted from one or more receivers within in a wire based communication system to one or more transmitters within the communication system so that channel equalization may occur at the transmitter.

Preferably, data signals and additional information signals preferably of low data rate, e.g. control information such as router flow control, network status information, amplitude control information, and link parameter setup information, are simultaneously transmitted within in a wire based communication system over the same wired medium.

DETAILED DESCRIPTION OF THE PREFERRED EMBODIMENTS

Because of the effects ISI introduced timing jitter has on receiver timing margin, there remains a need for a closed control loop for adjusting the predistortion settings at the transmitter to their optimum (e.g. 'minimum ISI') values by measuring the ISI introduced jitter at the receiver. This measurement would be used to provide a jitter reducing feed back signal to the predistortion settings of the transmitter. In an ideal embodiment, this feedback information should be transmitted over the same physical transmission lines which are already used for the signaling of the down stream data bits in order to minimize the number of required connections. Additionally, the simultaneously transmitted additional information signals should use the same frequency range as the system data in order to be compatible with AC coupling and low pass filter effects.

The concept of combining a high speed data down channel and a spread spectrum up channel is not limited to equalization. This concept may generally be applied where information additional (preferably of low data rate) to the main data to be transmitted over a wired communication system has to be signaled from the one side of a transmission system to the other side. Such types of additional information may include: flow control in internet switches, signaling of status information, amplitude control, link parameter setup or applications with very unsymmetrical data rates.

FIG. 1 illustrates a preferred embodiment of the present invention. The preferred embodiment of the present invention provides a system and method for transmitting equalization information from the receiver of a high-speed data link back to the transmitter while simultaneously transmitting the main data from the transmitter to the receiver. This function is critical for implementing a channel equalization system where channel adaptation is done in the transmitter instead of the receiver.

Wire based communication system 10 includes transmitter 12, receiver 14, and channel 16. Transmitter 12 may include any wire based communication system transmitter known in the art for transmitting system data 30 onto channel 16 with the addition of spread spectrum receiver 22 for receiving and despreading spreaded additional information signal 42 from channel 16. In addition to spread spectrum receiver 22, transmitter 12 also includes transmit circuitry 18 for performing transmitter-related functions such as timing and multiplexing and line driver 20 for driving data signals down link onto channel 16. Channel 16 may be any wired medium capable of carrying system data signals and spreaded additional information signals simultaneously, e.g. single ended or differential pair conductors. Both transmit circuitry 18 and line driver 20 are well understood by those skilled in the art; and therefore, do not require further explanation.

Receiver 14 may be any wire based communication system receiver known in the art for receiving system data 30 from channel 16 with the addition of spread spectrum transmitter 28. Spread spectrum transmitter 28 spreads and transmits additional information signal 40 up channel (opposite direction as system data 30) over channel 16. In addition to spread spectrum transmitter 28, receiver 14 also includes receive circuitry 24 for performing receiver-related functions such as timing, clock data recovery, and demultiplexing and line receiver 26 for receiving data signals down link from channel 16. Both receive circuitry 24 and line receiver 26 are well understood by those skilled in the art; and therefore, do not require further explanation.

FIG. 2 illustrates an alternate embodiment of the present invention. This embodiment of the present invention provides a system and method for transmitting low data rate additional information from the transmitter of a high-speed data link to the receiver while simultaneously transmitting the main data from the transmitter to the receiver.

Wire based communication system 70 includes transmitter 12, receiver 14, and channel 16. Transmitter 12 may include any wire based communication system transmitter known in the art for transmitting system data 30 onto channel 16 with the addition of spread spectrum transmitter 28 for spreading and transmitting additional information signal 40 down channel (same direction as system data 30) over channel 16. In addition to spread spectrum transmitter 28, transmitter 12 also includes transmit circuitry 18 for performing transmitter-related functions such as timing and multiplexing and line driver 20 for driving data signals down link onto channel 16. Channel 16 may be any wired medium such as single ended or differential pair.

Receiver 14 may be any wire based communication system receiver known in the art with the addition of spread spectrum receiver 22. Spread spectrum receiver 22 receives and despreads spreaded additional information signal 42 from channel 16. In addition to spread spectrum receiver 22, receiver 14 also includes receive circuitry 24 for performing receiver-related functions such as timing, clock data recovery, and demultiplexing and line receiver 26 for receiving data signals down link from channel 16.

FIG. 3 illustrates an alternate embodiment of the present invention. This embodiment of the present invention provides a system and method for transmitting a plurality of additional information signals from the receiver of a high-speed data link back to the transmitter while simultaneously transmitting the main data from the transmitter to the receiver.

Wire based communication system 80 includes transmitter 12, receiver 14, and channel 16. Transmitter 12 may include any wire based communication system transmitter known in the art for transmitting system data 30 onto channel 16 with the addition of spread spectrum receiver 22. Spread spectrum receiver 22 includes a plurality of spread spectrum receivers 23 for receiving and despreading a plurality of spreaded additional information signals 42 from channel 16. In addition to spread spectrum receiver 22, transmitter 12 also includes transmit circuitry 18 for performing transmitter-related functions such as timing and multiplexing and line driver 20 for driving data signals down link onto channel 16. Channel 16 may be any wired medium such as single ended or differential pair.

Receiver 14 may be any wire based communication system receiver known in the art for receiving system data 30 from channel 16 with the addition of spread spectrum transmitter 28. Spread spectrum transmitter 28 includes a plurality of spread spectrum transmitters 29 for spreading and transmitting a plurality of additional information signals 40 up channel over channel 16. In addition to spread spectrum transmitter 28, receiver 14 also includes receive circuitry 24 for performing receiver-related functions such as timing, clock data recovery, and demultiplexing and line receiver 26 for receiving data signals down link from channel 16.

FIG. 4 illustrates an alternate embodiment of the present invention. This embodiment of the present invention provides a system and method for transmitting an additional information signal from the receiver of a high-speed data link back to the transmitter and transmitting an additional information signal from the transmitter of a high-speed data link to the receiver while simultaneously transmitting the main data from the transmitter to the receiver.

Wire based communication system 90 includes transmitter 12, receiver 14, and channel 16. Transmitter 12 may include any wire based communication system transmitter known in the art for transmitting system data 30 onto channel 16 with the addition of spread spectrum receiver 22A and spread spectrum transmitter 28B. Spread spectrum receiver 22A receives and despreads spreaded additional information signal 42A from channel 16. Spread spectrum transmitter 28B spreads and transmits additional information signal 40B down channel over channel 16. In addition to spread spectrum receiver 22A and spread spectrum transmitter 28B, transmitter 12 also includes transmit circuitry 18 for performing transmitter-related functions such as timing and multiplexing and line driver 20 for driving data signals down link onto channel 16. Channel 16 may be any wired medium such as single ended or differential pair.

Receiver 14 may be any wire based communication system receiver known in the art for receiving system data 30 from channel 16 with the addition of spread spectrum transmitter 28A and spread spectrum receiver 22B. Spread spectrum transmitter 28A spreads and transmits additional information signal 40A up channel over channel 16. Spread spectrum receiver 22B receives and despreads spreaded additional information signal 42B from channel 16. In addition to spread spectrum transmitter 28A and spread spectrum receiver 22B, receiver 14 also includes receive circuitry 24 for performing receiver-related functions such as timing, clock data recovery, and demultiplexing and line receiver 26 for receiving data signals down link from channel 16.

Spread spectrum transmitter 28A should use a pseudo-random bit sequence which is sufficiently orthogonal to that used by spread spectrum transmitter 28B so that interference between additional information signal 42A and additional information signal 42B is minimized. Methods of generating sufficiently orthogonal pseudo-random bit sequences are well known within the art.

Although the preferred embodiment of the present invention implements a unidirectional wire based communication system (e.g. simplex), those skilled in the art will recognize the present invention may also be implemented in bi-directional systems (e.g. duplex), such as half-duplex or full-duplex systems. Those skilled in the art will also recognize the preferred embodiment of combining a high speed data downlink and a spread spectrum uplink is not limited to equalization. Such types of additional information may include, but are not limited to: control information such as network router or switch flow control, signaling of status information, amplitude control, link parameter setup or network applications with very unsymmetrical data rates.

Spread Spectrum Transmitter

FIG. 5 illustrates spread spectrum transmitter 28. The complexity of spread spectrum transmitter 28 is low to allow for continuous operation. A time sharing approach is used so that each link is sequentially equalized. This approach minimizes power consumption, area, and complexity of up-channel circuits.

Clock preparation circuitry 41 is electrically coupled to latch 42, encoder 44, serializer 46, pseudo-random bit sequencer (PRBS) generator 48, and scrambling circuitry 50. Clock preparation circuitry 41 reduces the frequency of clock 54 which is provided by receiver 14, and thus reduces power distribution and bandwidth of the spreaded additional information signal so that the bandwidth is smaller than the bandwidth of the data in order to avoid out-of-band signal energy.

Latch 42 is electrically coupled to encoder 44 and captures additional information signal 40 in a series of storage elements (e.g. latches). Encoder 44 is electrically coupled to latch 42 and serializer 46 and encodes the captured additional information from latch 42 (e.g. 10B/8B industry standard encoding, 64B/66B industry standard encoding, etc.). Serializer (e.g. shift register) 46 is electrically coupled to encoder 44 and scrambling circuitry 50 and serializes the encoded additional information from encoder 44. PRBS generator 48 is electrically coupled to scrambling circuitry 50 and generates pseudo-random bit sequences.

Scrambling circuitry 50 is coupled to serializer 46 and PRBS generator 48 and performs a spread spectrum function by modulating the serialized additional information from serializer 46 with the pseudo-random bit sequence from PRBS generator 48. Common mode circuitry 52 is coupled to scrambling circuitry 50 and injects the spreaded additional information signal from scrambling circuitry 50 as common mode current into the differential pair conductors of channel 16 where the spreaded additional information will travel via channel 16 to transmitter 12 of wire based communication system 10 where spread spectrum receiver 22 is located.

Figure 6:
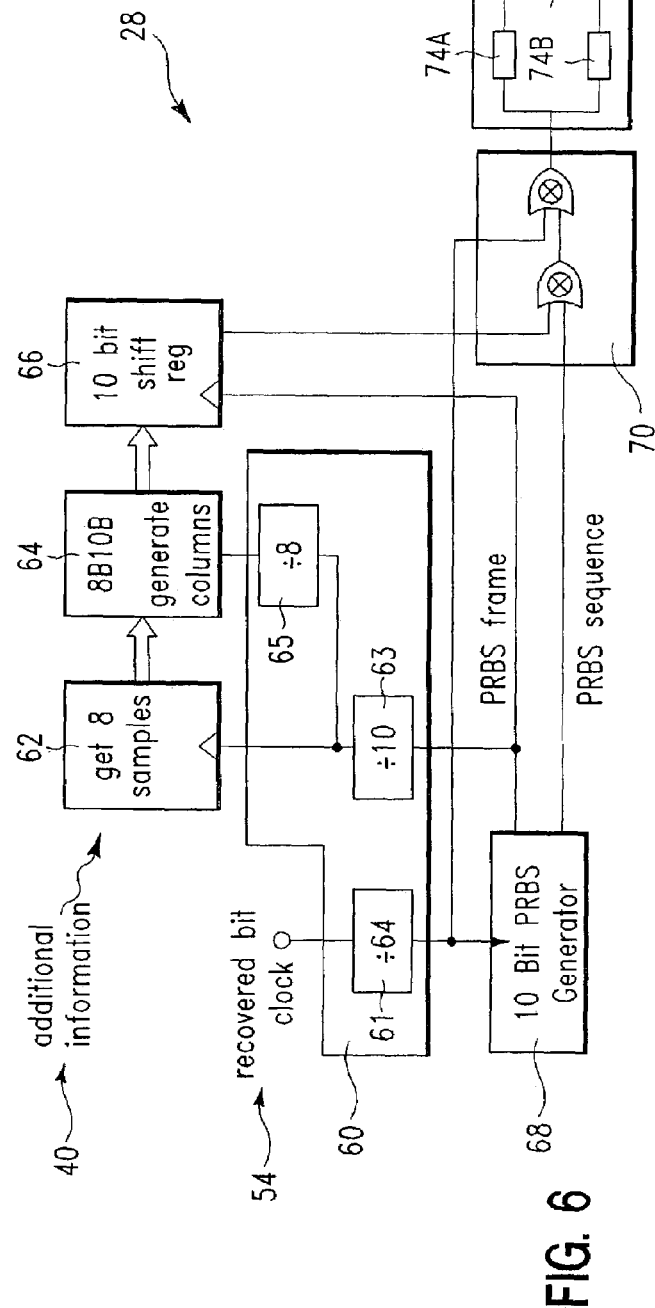
FIG. 6 is a diagram illustrating a spread spectrum transmitter of a preferred embodiment of the invention.

FIG. 6 illustrates a preferred embodiment of spread spectrum transmitter 28. Clock preparation circuitry 60 is electrically coupled to latch 62, encoder 64, serializer 66, PRBS generator 68, and scrambling circuitry 70. Clock preparation circuitry 60 includes clock divider circuitry 61, 63, and 65. One skilled in the art will recognize clock divider circuitry 61, 63, and 65 are selected according to the specifications of latch 62, encoder 64, and serializer 66, respectively. One skilled in the art will recognize other implementations may require different clock divider circuitry and selection of that clock divider circuitry is within the scope of the present invention.

Latch 62 is electrically coupled to encoder 64 and captures the additional information 40 in a series of latches. Encoder 64 is electrically coupled to latch 62 and serializer 66. Encoder 64 includes industry-standard 8B/10B encoding circuitry for encoding the captured additional information from latch 62 into industry standard 8B/10B format (e.g. provides availability of comma character, DC free signal, availability of idle symbols etc.). Serializer 66 is electrically coupled to encoder 64 and scrambling circuitry 70 and includes a shift register for serializing the 8B/10B coded additional information from encoder 64. PRBS generator 68 is electrically coupled to scrambling circuitry 70 and includes a ten bit PRBS generator for generating pseudo-random bit sequences.

Scrambling circuitry 70 is coupled to serializer 66 and PRBS generator 68 and includes two exclusive OR logic gates for modulating the 8B/10B coded additional information signal from serialization circuitry 66 with the pseudo-random bit sequence generated by PRBS generator 68.

Common mode circuitry 72 is coupled to scrambling circuitry 70 and injects the spreaded 8B/10B coded additional information from scrambling circuitry 70 into channel 16 by injecting common mode current representing the spreaded 8B/10B coded additional information into fifty Ohm termination resistors 74A and 74B.

Spread Spectrum Receiver

Figure 7:
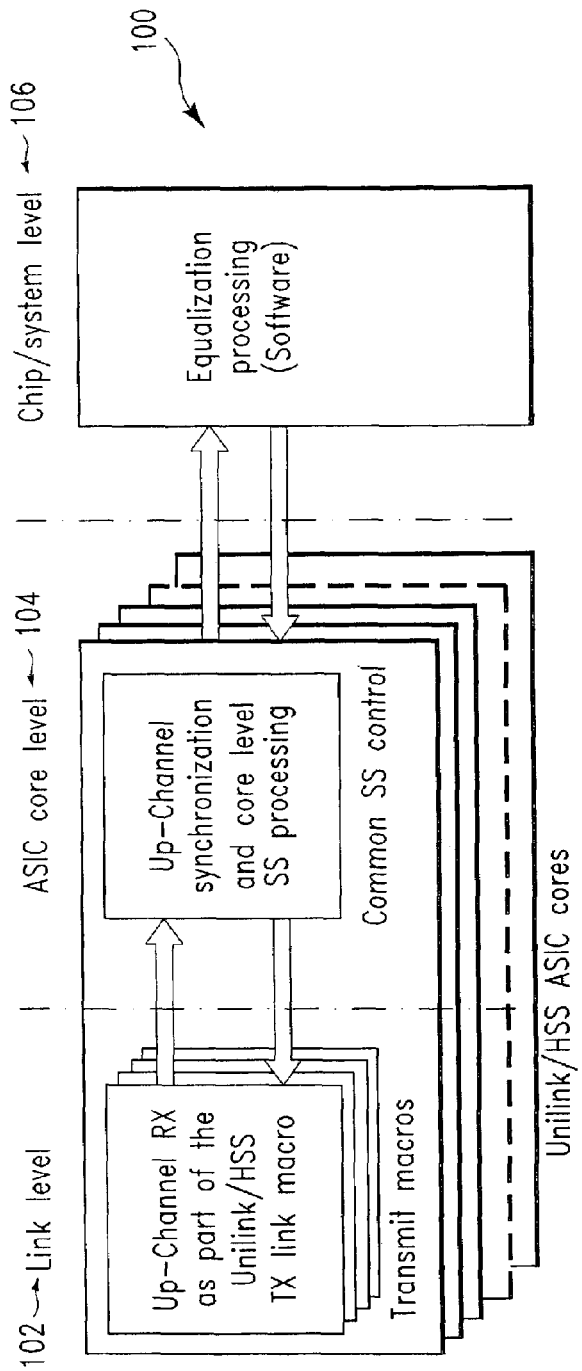
FIG. 7 is a diagram illustrating up-channel receiver functions.

FIG. 7 illustrates spread spectrum receiver functions 100 which reside in the transmit side of wire based communication system 10 of FIG. 1. Spread spectrum receiver functions 100 are split into three parts: link level functions (functions shared by several links) 102, ASIC core level functions 104, and chip/system level functions (equalization processing in software) 106. Such an approach allows for optimum distribution of power and minimization of complexity.

Link Level Spread Spectrum Receiver Functions

Figure 8:
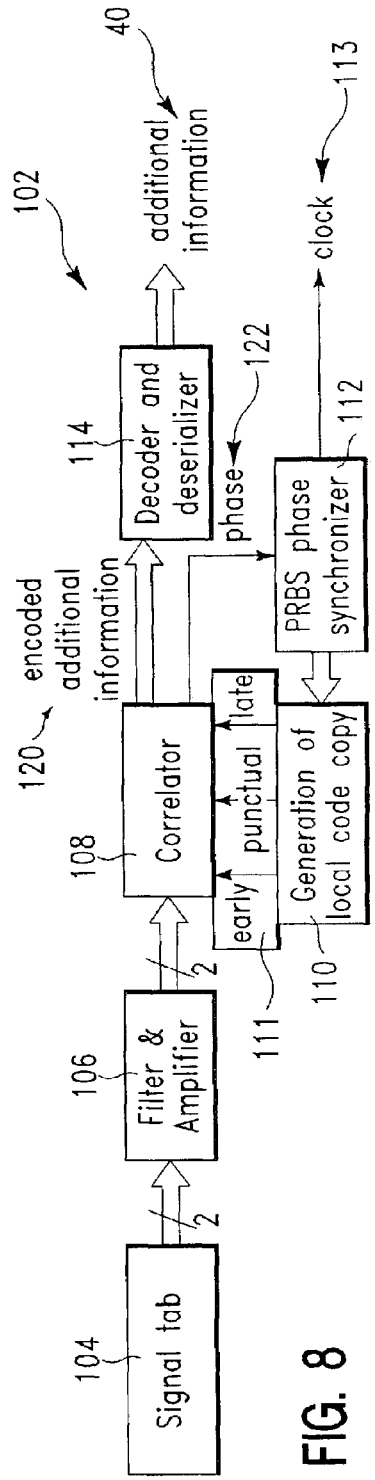
FIG. 8 is a diagram illustrating a spread spectrum receiver of a preferred embodiment.

FIG. 8 illustrates link level functions 102 which are included in spread spectrum receiver 22 of FIG. 1. Signal tab 104 is electrically coupled to filter and amplifier 106. Signal tab 104 receives the common mode spreaded additional information signal from channel 16 of wire based communication system 10 of FIG. 1. Filter and amplifier 106 are electrically coupled to signal tab 104 and correlator 108. Filter and amplifier 106 filter the spreaded additional information signal received from signal tab circuitry 104 and amplify it.

Correlator 108 performs a correlation between the filtered, amplified spreaded additional information signal received from filter and amplifier 106 and a locally generated version of the PRBS sequence which was used in spread spectrum transmitter 28 of FIG. 1. Correlator 108 has two digital outputs: despreaded, encoded additional information 120 which is transmitted to decoding circuitry 114 and phase information 122 which is transmitted to the phase synchronization circuitry 112.

Local code copy circuitry 110 is electrically coupled to correlator 108 and PRBS phase synchronizer 112. Local code copy circuitry 110 generates punctual/early/late versions 111 of the spread spectrum sequence and transmits punctual/early/late versions 111 to correlator 108. PRBS phase synchronizer 112 is electrically coupled to local code copy circuitry 110 and correlator 108. PRBS phase synchronizer 112 maintains phase synchronization with the PRBS sequence which was used in spread spectrum transmitter 28 of FIG. 1 and also generates synchronized clock 113.

Decoder and deserializer 114 are electrically coupled to correlator 108. Decoder and deserializer 114 convert despreaded, encoded additional information 120 from a serial representation to a parallel representation, decode the additional information signal (e.g. 8B/10B industry standard decoding), and output additional information signal 40.

Figure 9:
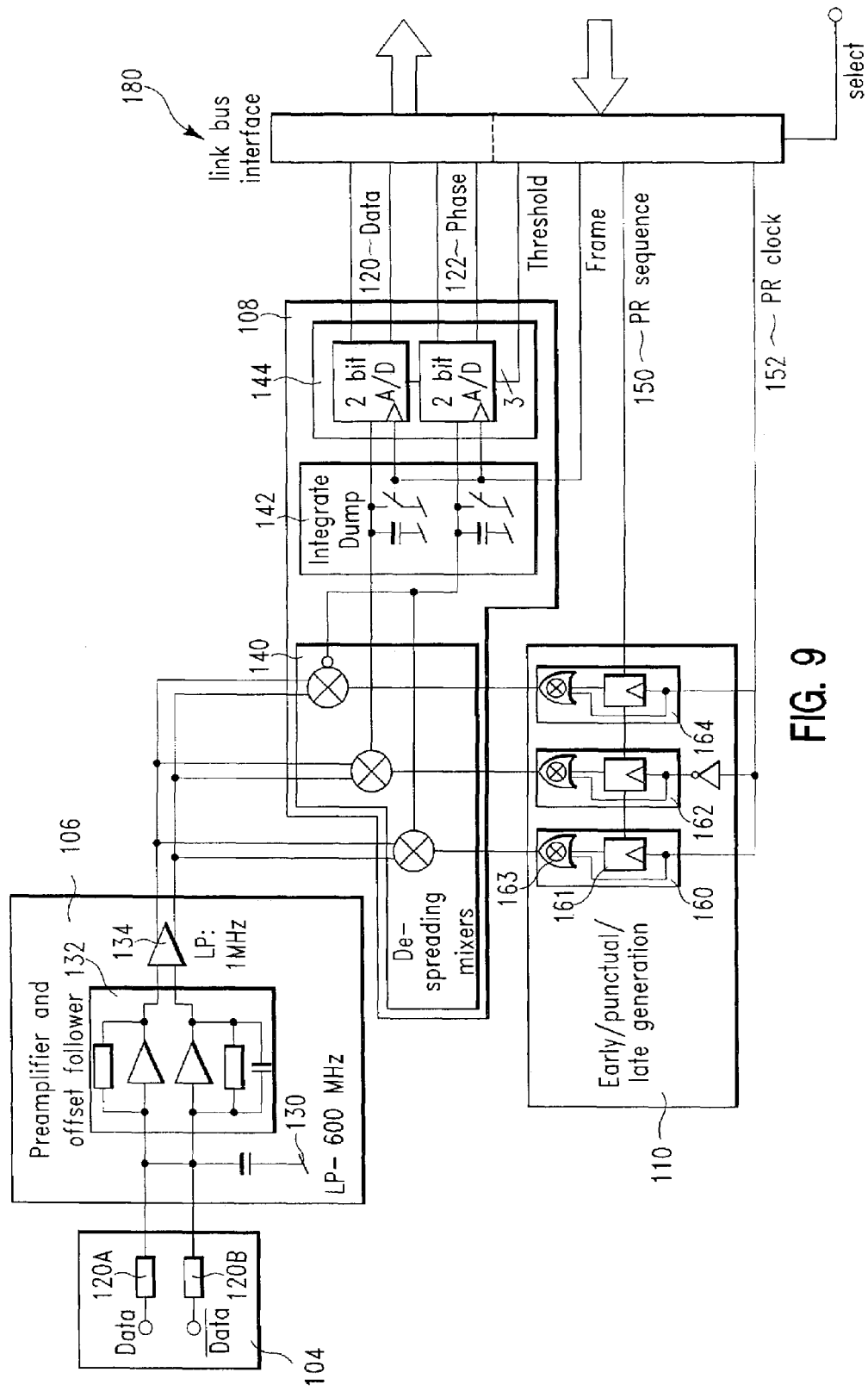
FIG. 9 is a diagram illustrating an amplifier, filter, and correlator components of a spread spectrum receiver of a preferred embodiment.

FIG. 9 illustrates the preferred embodiment for signal tab 104, amplifier and filter 106, correlator 108, and local code copy circuitry 110. Signal tab 104 includes fifty Ohm termination resistors 120A and 120B which are electrically coupled to the differential wire pair which form channel 16 of FIG. 1. Filter and amplifier 106 include low pass filter 130, preamplifier 132, and amplifier 134.

Correlator 108 includes de-spreading mixers 140, integrate/dump circuitry 142, and two analog to digital converters (A/D) 144. De-spreading mixers 140 perform correlation between the filtered, amplified spreaded additional information signal received from filter and amplifier 106 and a locally generated version of the PRBS sequence generated by the local code copy circuitry 110. Integrate/Dump circuitry 142 and A/Ds 144 receive the despreaded additional information signal from de-spreading mixers 140 and convert it to digital signal phase information 122 and despreaded, encoded additional information 120 and transmit those signals to link bus interface 180.

Local code copy circuitry 110 includes simple circuitry blocks 160, 162, and 164. Simple circuitry blocks 160, 162, and 164 each include latch 161 and exclusive OR gate 163 and generate the punctual/early/late local versions of the PRBS sequence which are transmitted to de-spreading mixers 140. Phase synchronization signals 150 and 152 are generated by PRBS phase synchronizer 112 of FIG. 8, received at link bus interface 180 and are used by local code copy circuitry 110 when generating the punctual/early/late local versions of the PRBS sequence.

Core-Level Spread Spectrum Receiver Functions

Figure 10:
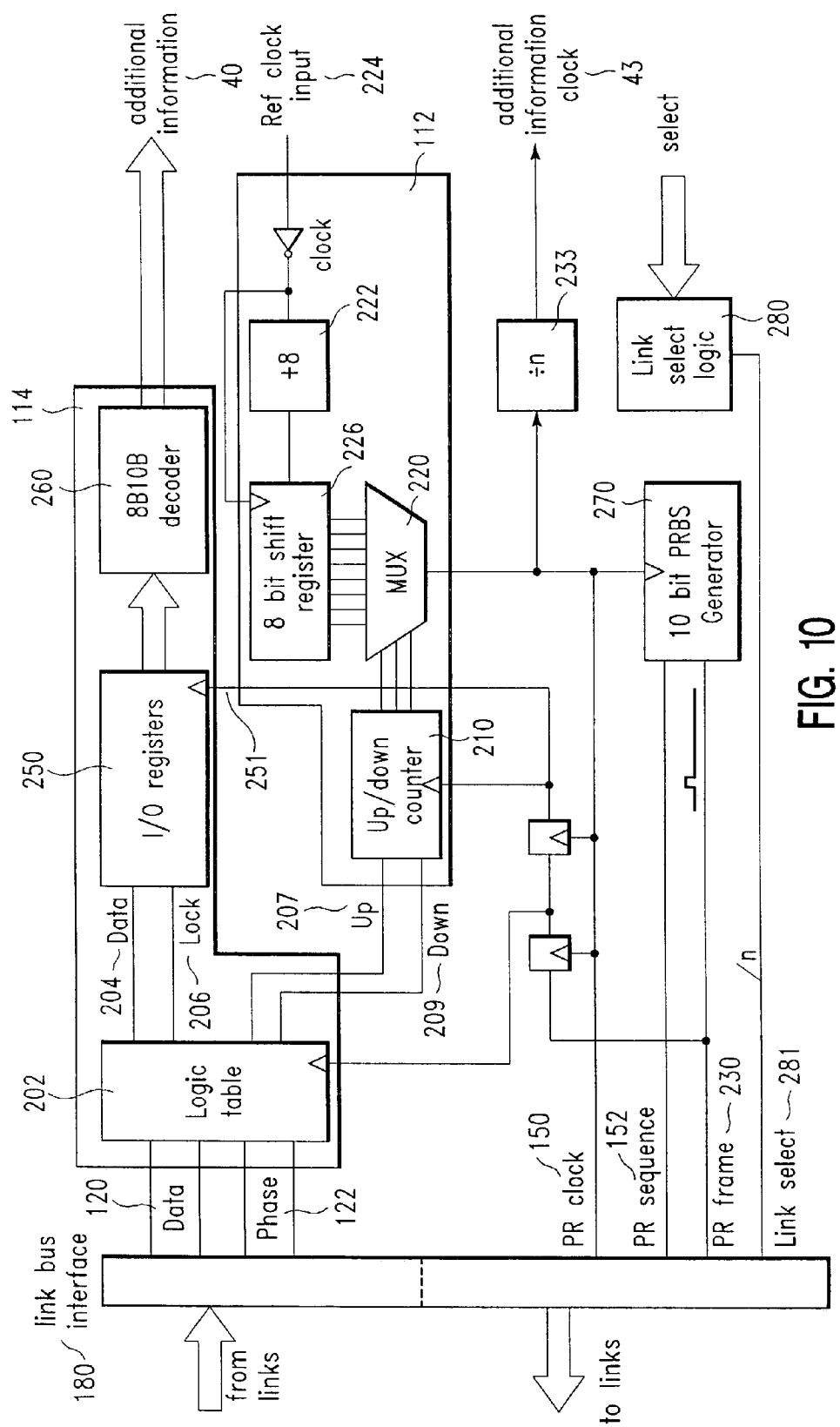
FIG. 10 is a diagram illustrating a pseudo-random bit sequencer (PRBS) phase synchronizer, local PRBS generator, conversion of data to parallel representation, and decoding components of a spread spectrum receiver of a preferred embodiment.

FIG. 10 illustrates ASIC core level functions 104 which are included in spread spectrum receiver 22 of FIG. 1. Decoder and deserializer 114 include logic table 202, registers 250, and decoder 260. Logic table 202 receives phase information 122 and despreaded, encoded additional information 120 from link bus interface 180 and converts those signals into data signal 204, lock signal 206, up signal 207, and down signal 209 using a simple logic truth table such as the one illustrated in FIG. 11. Lock signal 206 indicates locking of spread spectrum correlator 108 of FIG. 9 (e.g. generated and received spreading sequences are matched in their phase relationship). Additionally, up signal 207 and down signal 209 are generated to indicate whether the phase of the receiving spreading sequence should be increased or decreased to maintain and optimize the lock condition. Register 250 stores data signal 204 and lock signal 206 and performs a serial to parallel conversion on data signal 204. Clock 251 is derived from PRBS frame signal 230. The parallel data is fed into decoder 260 and is decoded using standard 8B/10B decoding logic. Decoder 260 outputs additional information signal 40. Additional information clock signal 43 is derived from spreading clock 150 and divide-by-n circuitry 233, where n is 10230 for a 10 bit PRBS generator and 8B/10B coding. In an alternate embodiment, the clock signal 43 would be derived from PRBS frame signal 230 with an additional division by 10 to account for 8B/10B encoding. Lock signal 206 is used to gate the 8B/10B data decoding in the case when no lock is achieved. It may be forwarded to the system user as additional user data to provide link debugging information.

PRBS phase synchronizer 112 includes up/down counter 210, multiplexer 220, divide by eight circuit (clock reduction circuitry) 222 and shift register 226. Up signal 207 and down signal 209 are used to either increment or decrement 3-bit up/down counter 210. The output of counter 210 is used to select one of eight outputs of clocking multiplexer 220. The input of clocking multiplexer 220 is derived from divided-by-eight reference clock 222. Each input is phase shifted by one cycle of reference clock 224 (e.g. each input=⅛ of reference clock 224).

The combination of counter 210, multiplexer 220 and shift register 226 allows for a very simple phase shifting of the spreading clock in either ⅛th increments or decrements. In particular, this is done completely in the digital domain without analog circuits. It should be noted that all logic blocks that are triggered based on the selected output clock of multiplexer 220 automatically have the same phase as the transmitter spreading clock. This is true after initial lock has occurred.

The shifted, spreading clock is used to trigger ten bit PRBS generator 270. In the preferred embodiment, a shift register with exclusive-OR feedback to generate a maximum length (e.g. $2^{10}-1$) PRBS would be used. PRBS generator 270 generates phase synchronization signals 150 and 152 and also asserts frame output 230 when all PRBS registers contain a logic '1'. Frame output 230 occurs only once within the $2^{10}-1$ steps of the PRBS generator and is used to trigger two bit A/Ds 144 and integrate/dump circuitry 142 of FIG. 9.

In a system which incorporates more than one link, link select logic 280 enables one of n links (where n is the total number of links) to be selected via link select signal 281.

Figure 11:
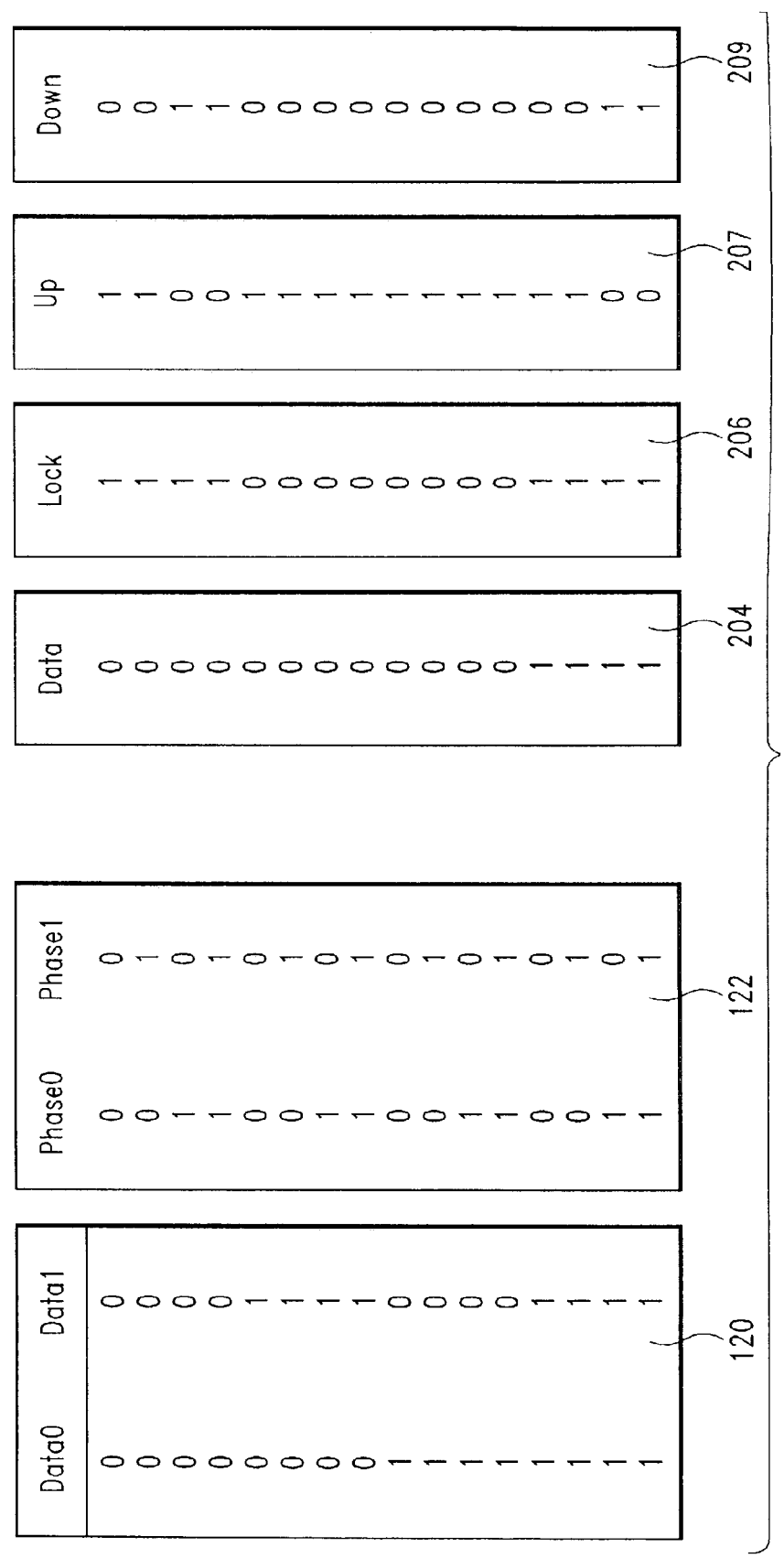
FIG. 11 is a diagram illustrating a logic truth table.

FIG. 11 illustrates the truth table of the preferred embodiment for logic table 202 in FIG. 10. Data signal 204 is derived from the two extreme settings generated by A/Ds 144 in FIG. 9: if signal 120 is '00' then data signal 204 is converted to a logic '0' value and if signal 120 is '11' then data signal 204 is converted to a logic '1' value. For the intermediate settings, the correlation is obviously not optimum and the loop is judged to be out of lock. Therefore, lock signal 206 is de-asserted for '01' and '10' outputs of A/Ds 144. To avoid problems in decoder logic 260 in FIG. 10, data signal 204 is forced to logic zero for loss-of-lock conditions. Up signal 207 and down signal 209 are derived from A/Ds 144 in FIG. 9: '00' and '01' generate an active up signal, while 10 and 11 result in an active down signal.

Loss of lock overrides A/Ds 144 to force a step through all PRBS phases to re-lock the loop.

System Operation

The present invention teaches the transmission of data signals and additional information signals simultaneously within a wire based communication system.

Figure 12:
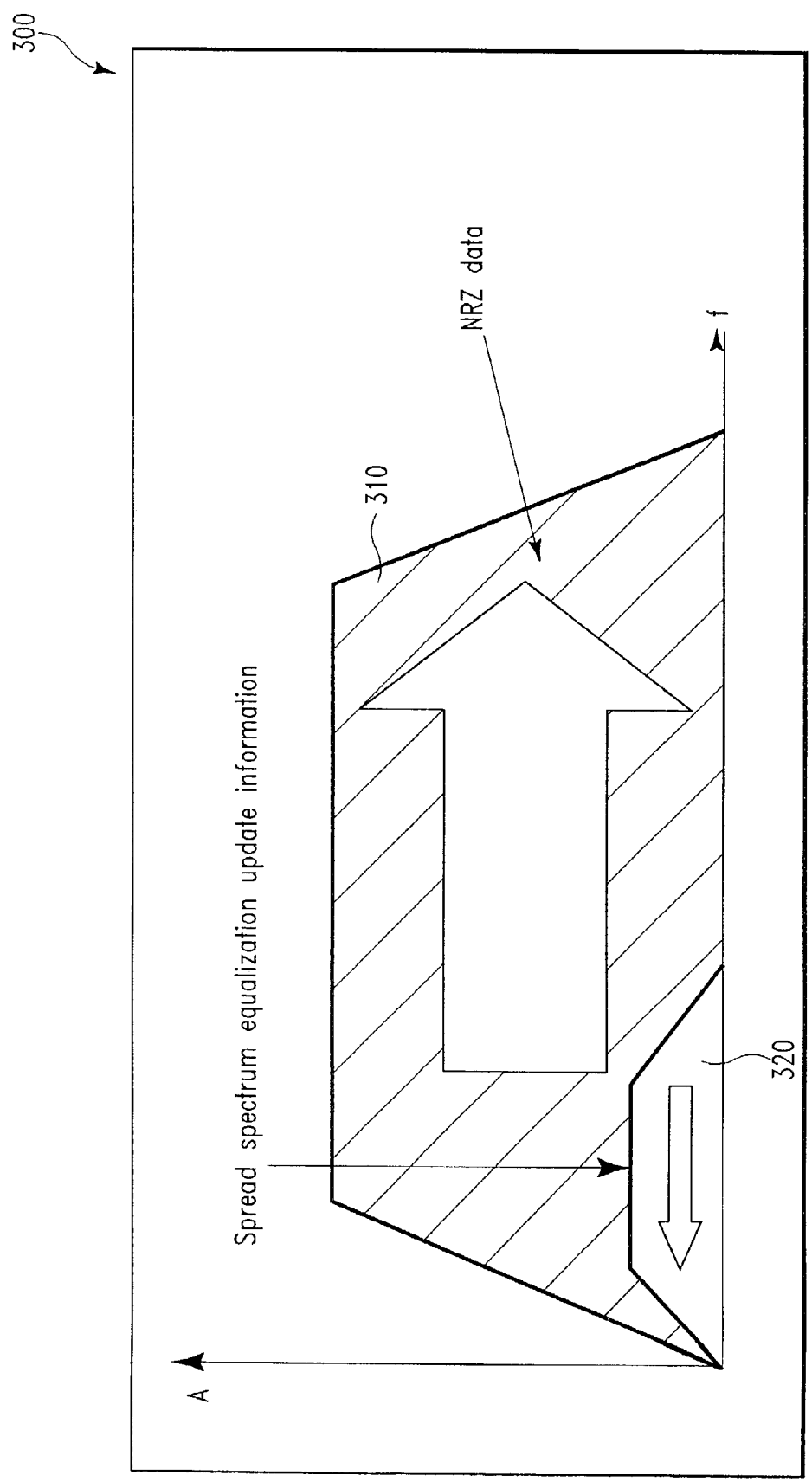
FIG. 12 is a diagram illustrating typical 'signal content vs. frequency' plot.

The preferred embodiment of the present invention teaches the use of a spread spectrum modulation technique for modulating equalization information. FIG. 12 illustrates power spectral densities 300 of main data signal 310 and spreaded equalization information signal 320. Spread equalization information signal 320 has a very low energy within one downlink bit time (main data rate) because of a potentially large spreading factor that may be applied to the equalization information signal because the up channel equalization information density is very small compared to the down channel data rate. This is so because the channel in a wired link is quasi static and an equalization algorithm may run at a slow rate. The ratio between down channel data rate and up channel equalization information rate is very large and may approach ratios greater than one thousand to one. Thus, a drastic reduction in the up channel equalization information amplitude may be obtained. This allows spreaded equalization information signal 320 to be added to the incoming main data signal 310 at the receiver side of the link without noticeable degradation to the signal.

Those skilled in the art will acknowledge that there are several ways to spread signals over a wide frequency band. Even though the preferred embodiment describes a direct sequence spread spectrum signal, any other known spreading method would be applicable as well. In particular, methods applying frequency hopping, ultra wideband pulse modulation, ultra wideband frequency or phase modulation or the combination of any of those methods would have the same effect.

Referencing FIG. 1, the main data to be transmitted over the wire based communication system is processed by transmit circuitry and then transmitted down channel by a line driver. The main data is then received by a line receiver and processed by receive circuitry. Simultaneous to the main data transmission, additional information is also transmitted over the channel in the opposite direction to the main data (up channel). A spread spectrum transmitter spreads and transmits the additional information signal up channel from the receive side of the wire based communication system over the channel. The spread spectrum receiver receives the spreaded additional information signal and sends it to the communication system for processing.

The preferred embodiment of the present invention teaches a simple spread spectrum up link which enables continuous adaptive equalization of each individual link. The spreaded equalization information signal may be detected with low effort at transmitter 12 by spread spectrum receiver 22 because of the large spread spectrum coding gain which may be expected. A simple direct sequence spread spectrum system is sufficient, resulting in low additional complexity and low power consumption. In addition, the present invention provides for longer transmission distances because the non-ideal effects of the transmission channel are adaptively corrected. This invention also provides a reduction in link power consumption because the amplitude of the equalization information signals may be automatically adjusted so that there is no excess power generated and transmitted.

Referencing FIG. 2, the main data to be transmitted over the wire based communication system is processed by transmit circuitry and then transmitted down channel by a line driver. The main data is then received by a line receiver and processed by receive circuitry. Simultaneous to the transmission of the main data, additional information is also transmitted over the channel in the same direction as the main data (down channel). A spread spectrum transmitter spreads and transmits the additional information down channel from the transmit side of the wire based communication system. The spread spectrum receiver receives the spreaded additional information signal and sends it to the communication system for processing.

Referencing FIG. 3, the main data to be transmitted over the wire based communication system is processed by transmit circuitry and is then transmitted down channel by a line driver. The main data is then received by a line receiver and processed by receive circuitry. Simultaneous to the transmission of the main data, a plurality of additional information signals are also transmitted up channel. A spread spectrum transmitter includes a plurality of spread spectrum transmitters adapted to spread and transmit the plurality of additional information signals up channel from the receive side of the wire based communication system. The spread spectrum receiver includes a plurality of spread spectrum receivers adapted to receive the plurality of spreaded additional information signals and send then to the communication system for processing.

Referencing FIG. 4, the main data to be transmitted over the wire based communication system is processed by transmit circuitry and is then transmitted down channel by a line driver. The main data is then received by a line receiver and is processed by receive circuitry. Simultaneous to the transmission of the main data, a first additional information signal is transmitted up channel and a second additional information signal is transmitted down channel. A first spread spectrum transmitter spreads and transmits the first additional information signal up channel from the receive side of wire based communication system. A first spread spectrum receiver receives the first spreaded additional information signal and sends it to the communication system for processing. A second spectrum transmitter spreads and transmits the second additional information signal down channel from the transmit side of wire based communication system. The second spread spectrum receiver receives the second spreaded additional information signal and sends it to the communication system for processing.

Various other modifications and alterations in the system and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for transmitting data and additional information within a wire based communication system, said method comprising the steps of:
    using a transmitter combined with a spread spectrum receiver to transmit said data to a receiver combined with a spread spectrum transmitter over a first frequency band of a wired medium;
    spreading said additional information over a second frequency band of said wired medium so that said second frequency band at least partially overlaps said first frequency band; and
    using the spread spectrum transmitter to transmit said spreaded additional information to the spread spectrum receiver simultaneously with said data, wherein:
    said wired medium carries said data in one direction and carries said spreaded additional information in an opposite direction; and
    the spread spectrum receiver includes:
        a signal tab adapted to receive said spreaded additional information and the signal tab includes termination resistors adapted to receive common mode current representing said spreaded additional information from said wired medium and
        a correlator adapted to despread said spreaded additional information, the correlator including:
            a despreading mixer electrically coupled to a local code copy circuitry and adapted to despread said spreaded additional information, and
            integrate and dump circuitry adapted to convert said despreaded additional information to phase information and despreaded, encoded additional information.

2. The method of claim 1 wherein said additional information is transmitted at a rate much lower than said data.

3. The method of claim 1 wherein said additional information relates to the physical layer of said wire based communication system.

4. The method of claim 3 wherein said additional information relates to channel equalization.

5. The method of claim 4 wherein said channel equalization occurs at the transmitter of said transmitted data.

6. The method of claim 1 wherein said additional information relates to control information.

7. The method of claim 6 wherein said control information controls operation of a device within a network.

8. The method of claim 7 wherein said control information relates to network router flow control.

9. The method of claim 7 wherein said control information relates to network switch flow control.

10. The method of claim 6 wherein said additional information relates to status information.

11. The method of claim 6 wherein said additional information relates to link parameter initialization information.

12. The method of claim 6 wherein said additional information relates to network applications with unsymmetrical data rates.

13. The method of claim 1 wherein said wired medium is selected from the group consisting of single ended and differential pair.

14. The method of claim 1 wherein said additional information is spreaded by at least one of direct sequence spread spectrum, frequency hopping, ultra wideband pulse modulation, ultra wideband frequency modulation and phase modulation.

15. A method for transmitting data, a first sequence of additional information, and a second sequence of additional information within a wire based communication system, said method comprising the steps of:
    using a transmitter combined with a first spread spectrum receiver and a first spread spectrum transmitter to transmit said data to a receiver combined with a second spread spectrum transmitter and a second spread spectrum receiver over a first frequency band of a wired medium;
    spreading said first sequence of additional information over a second frequency band of said wired medium so that said second frequency band at least partially overlaps said first frequency band;
    spreading said second sequence of additional information over a third frequency band of said wired medium so that said third frequency band at least partially overlaps said first frequency band and said first spreaded sequence of additional information is separated by at least one of code, time and frequency domain from said second spreaded sequence of additional information;
    using the first spread spectrum transmitter to transmit said first spreaded additional information to the second spread spectrum receiver over said wired medium in a first direction simultaneously with said data; and
    using the second spread spectrum transmitter to transmit said second spreaded additional information to the first spread spectrum receiver over said wired medium in a second direction opposite said first direction simultaneously with said data:
    wherein the first and second spread spectrum receivers each include:
        a signal tab adapted to receive said spreaded additional information and each signal tab includes termination resistors adapted to receive common mode current representing said spreaded additional information from said wired medium and
        a correlator adapted to despread said spreaded additional information, the correlator including:
            a despreading mixer electrically coupled to a local code copy circuitry and adapted to despread said spreaded additional information, and
            integrate and dump circuitry adapted to convert said despreaded additional information to phase information and despreaded, encoded additional information.

* * * * *